United States Patent
Bieber et al.

(10) Patent No.: US 11,575,977 B2
(45) Date of Patent: Feb. 7, 2023

(54) SECURE PROVISIONING, BY A CLIENT DEVICE, CRYPTOGRAPHIC KEYS FOR EXPLOITING SERVICES PROVIDED BY AN OPERATOR

(71) Applicant: NAGRAVISION S.A., Cheseaux-sur-Lausanne (CH)

(72) Inventors: Yann Bieber, Cheseaux-sur-Lausanne (CH); André Nicoulin, Cheseaux-sur-Lausanne (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 106 days.

(21) Appl. No.: 17/012,440

(22) Filed: Sep. 4, 2020

(65) Prior Publication Data
US 2020/0404392 A1 Dec. 24, 2020

Related U.S. Application Data

(63) Continuation of application No. 16/073,752, filed as application No. PCT/EP2016/081822 on Dec. 20, 2016, now abandoned.

(30) Foreign Application Priority Data

Dec. 23, 2015 (EP) .................................. 15202609

(51) Int. Cl.
*H04L 9/08* (2006.01)
*H04N 21/835* (2011.01)
(Continued)

(52) U.S. Cl.
CPC ........... *H04N 21/835* (2013.01); *H04L 9/083* (2013.01); *H04L 9/088* (2013.01); *H04L 9/0819* (2013.01);
(Continued)

(58) Field of Classification Search
CPC ............. H04N 21/835; H04N 21/4405; H04N 7/1675; H04N 21/63345; H04L 9/0819;
(Continued)

(56) References Cited

U.S. PATENT DOCUMENTS 5,557,346 A * 9/1996 Lipner .................. H04L 9/0894
380/285
8,726,403 B2 * 5/2014 Huang ............... H04N 21/8355
713/168
(Continued)

FOREIGN PATENT DOCUMENTS

CN 101527818 A 9/2009
EP 2 736 190 A1 5/2014

OTHER PUBLICATIONS

Q. Huang, Z. Ma, Y. Yang, X. Niu and J. Fu, "Attribute based DRM scheme with dynamic usage control in cloud computing," in China Communications, vol. 11, No. 4, pp. 50-63, Apr. 2014, doi: 10.1109/CC.2014.6827568. (Year: 2014).*
(Continued)

*Primary Examiner* — Khalid M Almaghayreh
(74) *Attorney, Agent, or Firm* — Oblon, McClelland, Maier & Neustadt, L.L.P.

(57) ABSTRACT

A method for securely receiving a multimedia content by a client device operated by one or more operator(s) involving a dedicated provisioning server of a security provider managing symmetric secrets used by the client devices and operators license servers. The provisioning server provides to the client device one or more generations of operator specific unique device secrets, which are then exploited by the various operators' license servers to deliver licenses such that authorized client devices can consume protected multimedia contents.

19 Claims, 2 Drawing Sheets

(51) Int. Cl.
*H04L 9/16* (2006.01)
*H04N 7/167* (2011.01)
*H04N 21/6334* (2011.01)
*H04N 21/4405* (2011.01)
*H04L 9/14* (2006.01)

(52) U.S. Cl.
CPC .......... *H04L 9/0822* (2013.01); *H04L 9/0825* (2013.01); *H04L 9/14* (2013.01); *H04L 9/16* (2013.01); *H04N 7/1675* (2013.01); *H04N 21/4405* (2013.01); *H04N 21/63345* (2013.01)

(58) Field of Classification Search
CPC ....... H04L 9/14; H04L 9/0822; H04L 9/0825; H04L 9/083; H04L 9/088; H04L 9/16
See application file for complete search history.

(56) References Cited

U.S. PATENT DOCUMENTS

| | | | | |
|---|---|---|---|---|
| 9,219,607 | B2* | 12/2015 | Nakhjiri | G06F 21/33 |
| 9,398,009 | B2* | 7/2016 | Mun | H04L 63/0853 |
| 2002/0019814 | A1* | 2/2002 | Ganesan | H04L 63/10 |
| | | | | 707/999.009 |
| 2002/0169974 | A1* | 11/2002 | McKune | G06F 21/10 |
| | | | | 726/31 |
| 2003/0145203 | A1* | 7/2003 | Audebert | G06Q 20/341 |
| | | | | 713/169 |
| 2004/0088176 | A1* | 5/2004 | Rajamani | G06Q 30/06 |
| | | | | 717/177 |
| 2005/0033964 | A1* | 2/2005 | Albanese | H04N 21/4367 |
| | | | | 348/E7.056 |
| 2005/0273629 | A1* | 12/2005 | Abrams | G06F 21/10 |
| | | | | 713/189 |
| 2006/0112182 | A1* | 5/2006 | Chen | H04L 67/2833 |
| | | | | 707/999.001 |
| 2007/0150963 | A1* | 6/2007 | Lee | G06F 21/32 |
| | | | | 726/27 |
| 2007/0206799 | A1* | 9/2007 | Wingert | G06F 21/10 |
| | | | | 348/E7.071 |
| 2008/0098212 | A1* | 4/2008 | Helms | H04N 21/4627 |
| | | | | 713/155 |
| 2008/0152149 | A1* | 6/2008 | Bauchot | H04N 21/41407 |
| | | | | 380/279 |
| 2008/0255994 | A1* | 10/2008 | Schnell | G06C 3/00 |
| | | | | 705/52 |
| 2008/0256592 | A1* | 10/2008 | Schnell | G06F 21/10 |
| | | | | 726/1 |
| 2008/0260155 | A1* | 10/2008 | Kasahara | G06F 21/10 |
| 2008/0279385 | A1* | 11/2008 | Park | G06Q 20/32 |
| | | | | 380/278 |
| 2009/0290711 | A1* | 11/2009 | Bloom | H04N 7/163 |
| | | | | 380/239 |
| 2012/0008779 | A1* | 1/2012 | Wendling | H04L 9/088 |
| | | | | 380/255 |
| 2013/0121489 | A1* | 5/2013 | Pestoni | H04N 21/2347 |
| | | | | 380/278 |
| 2014/0146966 | A1 | 5/2014 | Bieber | |
| 2016/0182465 | A1* | 6/2016 | Lám | H04L 63/123 |
| | | | | 713/171 |
| 2020/0162252 | A1* | 5/2020 | Davis | H04L 9/088 |

OTHER PUBLICATIONS

International Search Report and Written Opinion dated Mar. 13, 2017 in PCT Application No. PCT/EP2016/081822.

ATTM (Access, Terminals, Transmission and Multiplexing) Integrated Broadband Cable and Television Networks; K-LAD Functional Specification; Draft ETSI TS 103 162, European Telecommunications Standards Institute (ETSI), vol. Cable-AT3, No. V0.0.3, Jul. 29, 2010, pp. 1-14.

Combined Chinese Office Action and Search Report dated Aug. 5, 2020 in Patent Application No. 201680076260.4 (with English language translation and English translation of Category of Cited Documents), citing documents AA and AO therein, 9 pages.

Brazilian Office Action dated Sep. 16, 2020 in Brazilian Patent Application No. BR112018011779-0, citing documents AA and AO therein, 4 pages.

* cited by examiner

SECURE PROVISIONING, BY A CLIENT DEVICE, CRYPTOGRAPHIC KEYS FOR EXPLOITING SERVICES PROVIDED BY AN OPERATOR

CROSS-REFERENCE TO RELATED APPLICATION

This application claims the benefit of priority to U.S. patent application Ser. No. 16/073,752, filed Jul. 27, 2018, and entitled "SECURE PROVISIONING, BY A CLIENT DEVICE, CRYPTOGRAPHIC KEYS FOR EXPLOITING SERVICES PROVIDED BY AN OPERATOR," which is a national stage entry of PCT/EP2016/081822 filed Dec. 20, 2016, which claims priority to EP 15202609.2 filed Dec. 23, 2015. The entire contents of the prior applications are hereby incorporated by reference in their entirety.

INTRODUCTION

The present disclosure generally relates to a method for provisioning in a secure way unique operator specific cryptographic keys in client devices in order to use services provided by one or more operators. In particular, the services require a strong client authentication, a strong binding of sensitive data to a specific client device and a clean segmentation of the unique device keys between operators.

TECHNICAL BACKGROUND

Currently, when a client device needs to authenticate a request for a service to an operator and receives in response to the request a license including data bound to the client device, crypto materials are required.

When using certificates and asymmetric secrets, such as an asymmetric key pair including a private key and a public key, in a client device, the crypto materials required to authenticate the client device may be as simple as a certificate, which may be provided by a Certificate Authority authenticating a certificate related to the client device such as an End-Entity Certificate. The crypto materials for binding data to the client device may be the public key contained in the End-Entity Certificate itself.

However some client devices rely on symmetric secrets, in particular when client devices implement some form of key ladder according, for example, to European Telecommunications Standards Institute ETSI TS 103 162, "ATTM (Access, Terminals, Transmission and Multiplexing) Integrated Broadband Cable and Television Networks; K-LAD Functional Specification" standard or operator proprietary key ladder standards. In this case, the crypto materials to be deployed on servers to authenticate a client device, and returned licenses bounded to the client device are usually in form of a large list of symmetric secrets. This list of secrets may be complex to secure when software of the servers is deployed in public clouds. The list is also difficult to maintain when updating, uploading into the servers or deploying in shared storage devices.

Document US2007/206799A1 discloses a digital rights management system, wherein a client device is first authenticated using a device public key that is sent to a trusted third party. After authentication, a first and second symmetric key are sent, encrypted with the device public key, that can only be decrypted with the corresponding device private key.

Document EP2736190A1 discloses a method for securely transferring content between devices within a network managed by a management center. The method includes an activation of the network; a keys recovering phase; and a transfer of a content. A network key is transferred to two devices that wish to exchange content. A content key is encrypted using a device key and is sent to the devices with a device specific value. By using the device value, each device can decrypt the encrypted network key by deriving the device specific key using the received device value and a secret value stored in the respective devices. The sending device then generates a random value with which the actual content key can be derived.

A client device may be a pay-TV set-top-box, a television set, a portable or desktop computer, a tablet, a smartphone or any other types of device able to manage and use symmetric secrets, for example, in form of key ladders. The client device can establish bidirectional connections with a communication network, such as the Internet, in order to transmit requests to remote servers and receive answers from them.

SUMMARY

According to an embodiment as detailed by claim 1, there is disclosed a method for securely provisioning by a client device unique cryptographic keys and/or key material to be used for exploiting scrambled services provided by an operator. According to the embodiment, the unique device cryptographic keys are specific to different operators on a same client device.

According to an embodiment as detailed by claim 9, there is disclosed a client device configured to exploit a scrambled service provided by an operator.

The proposed solution relies on a dedicated provisioning server of a security provider managing symmetric secrets used by a client device. The method for securely receiving a multimedia content by a client device operated by one or more operator(s) involves a dedicated provisioning server of a security provider managing symmetric secrets used by the client devices and operators license servers. The provisioning server provides, to the client device, one or more generations of operator specific unique device secrets, which are then exploited by the various operators' license servers to deliver licenses such that authorized client devices can consume protected multimedia contents.

In an example aspect the present disclosure, the set of unique data and the global data may be renewed in case of security issues on the operator servers. When a key is compromised a re-provisioning of the client device is not necessary thanks to pre-delivery of several sets, also called generations, of protected unique keys to the client device.

The proposed solution guaranties a full segmentation of the keys among the operators using a same client device is, In an example aspect the present disclosure, a key ladder may be used so that any key is protected by a client device personal root key. The key ladder may, for example, be implemented in the client device in hardware form so that the keys of the ladder and the root key are not accessible by any software present in the client device.

The proposed solution may further allow a control of client device activation by using authentication based on the key ladder and the unique operator specific device secret by using for example a white list of client device per operator and clean billing in the provisioning server.

By using a small set of global data in each operator server, the present disclosure allows an easy operation and reduces the set of sensitive data to secure in the cloud.

DETAILED DESCRIPTION

Following notation and abbreviations are hereafter used:
An asset K is a generic term designating a vault, seed or a key as used in the following examples by the servers and/or the client devices. A vault or container contains one of or a set of information data, cryptographic material, encrypting/decrypting keys, identifiers or parameters.

$^U K$: A Unique asset K (e.g. a chipset secret stored in a One Time Programmed memory), $^G K$: A completely global asset K, $^{UO} K$: A unique asset K, specific to an operator, $^{GO} K$: A global asset K assigned to a specific operator, $^U DK$: unique client device personal key, for example, hard coded, $^{GO} OpVault_{Gen}$: global operator vault (container) assigned to a specific operator, $^{GO} OpSeed_{Gen}$: global operator seed (cryptographic material used for building one or more cryptographic keys) assigned to a specific operator, $^{UO} K_{DER\ Gen}$: unique derived key specific to an operator, $^{GO} K_{LS\ Gen}$: global Key of an operator license server assigned to a specific operator.

Square brackets [ ] at left and right side of an asset reference mean that the asset is encrypted with a key which reference follows the right bracket. For example [Kp]CK means that the asset Kp is encrypted with the key CK. An encrypted asset, as for example [Kp]CK, forms a cryptogram.

The suffix "Gen" means that the concerned vault, seed, or key are Generation controlled. In case of a key compromising on a server, a new provisioning to the next generation is performed.

In order to prevent re-provisioning, the servers may provide multiple sets or generations of vaults, seeds, or keys to be stored in a non-volatile memory of the client device. In the event that a key is compromised the client device may switch to a further generation of vault, seed, or key without re-provisioning or requesting them from the servers.

Figure 1:
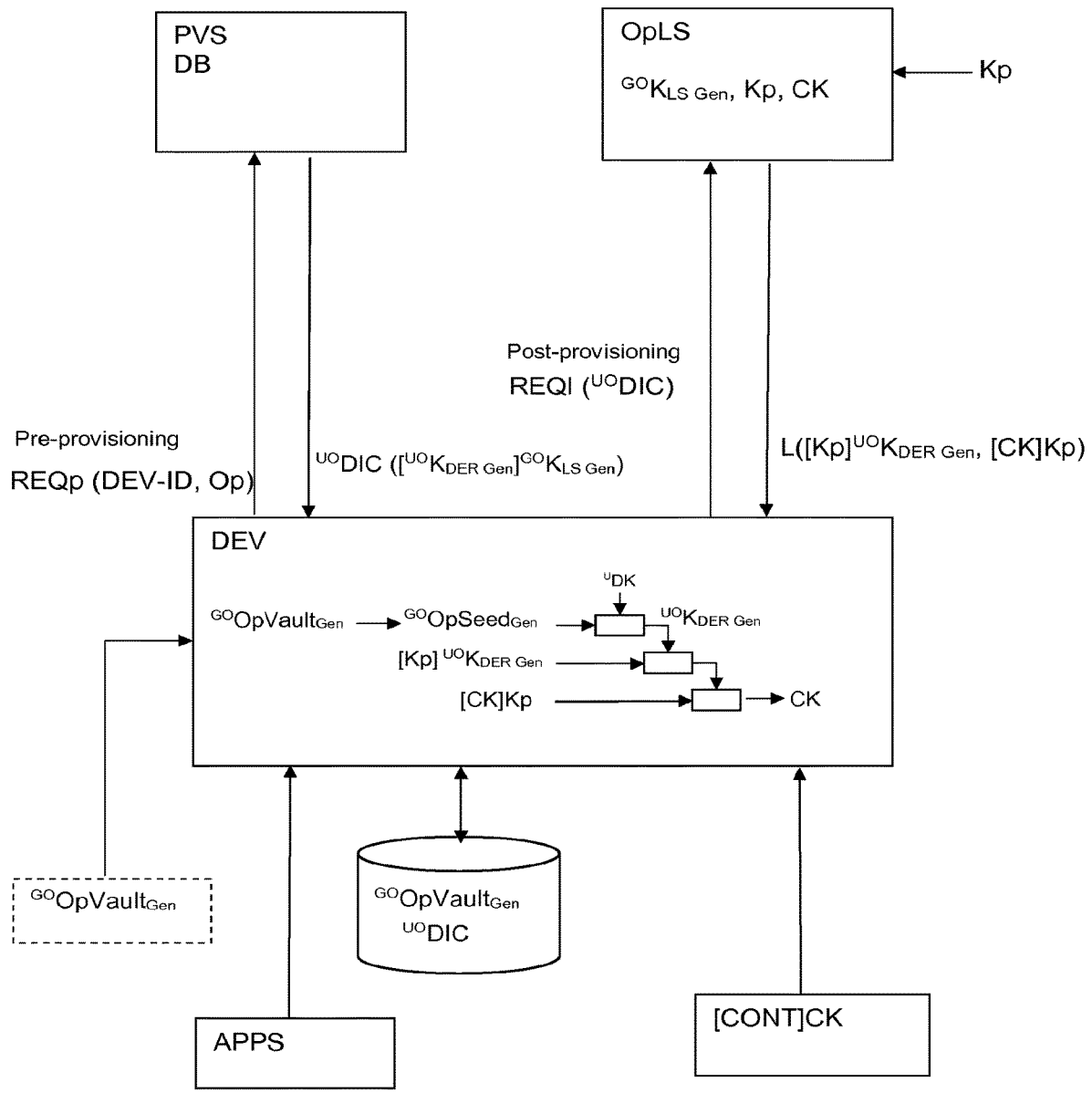
FIG. 1 shows a schematic diagram of an exemplary system comprising a provisioning server, an operator license server and a client device. The client device receives device unique operator specific key material from the provisioning server and submits said key material to the operator license server for receiving licenses containing uniquely encrypted content key for descrambling a service provided by the operator.

Referring to FIG. 1, a schematic diagram of an exemplary system includes a provisioning server PVS, an operator license server OpLS and a client device DEV. According to an exemplary configuration, the client device DEV may connect firstly to a provisioning server PVS of a security provider and secondly to an operator license server OpLS managed by an operator or service provider. The provisioning server PVS may be coupled to a database DB containing identifiers, keys and parameters associated with client devices and the same associated with operators. According to an embodiment, the provisioning server PVS and operator license server OpLS may be grouped in one server providing to the client device DEV global keys specific to the operator, personalized licenses and keys for exploiting a particular service.

According to a further embodiment, resources of the servers (e.g., services providing, cryptographic materials generation, data storage and managing capabilities, etc.) may be distributed in a cloud. A cloud as used herein may refer to a network of remote servers hosted on the Internet and used to store, manage, access to software and other resources, and process data in place of local servers or personal computers.

Initialization Phase Carried Out by the Client Device

According to an embodiment, the client device DEV may be provided with an application dedicated to the operator Op (not shown) by downloading the application from an application server APPS of the operator or from an applications store in the cloud. Once the application is installed in the client device DEV, the application allows downloading and storing in a non-volatile memory of the client device DEV a global operator vault $^{GO} OpVault_{Gen}$. The global operator vault $^{GO} OpVault_{Gen}$ may be refer to a container containing at least a global operator seed $^{GO} OpSeed_{Gen}$ comprising cryptographic parameters that are used during an exploitation phase of the client device DEV, described below, to calculate a unique device key specific to the operator Op to be used for decrypting keys related to a service.

The client device DEV may exploit services provided by more than one operator. In this case, an application dedicated for each operator Op may be installed in order to download one global operator vault $^{GO} OpVault_{Gen}$ for each operator. A common application for several operators may also be employed for downloading one global vault per operator.

The global operator vault $^{GO} OpVault_{Gen}$ may be provided either by the application server APPS, or a server of the operator (not shown), or the provisioning server PVS.

According to a further embodiment, an option of the application may allow downloading one or more global operator vaults $^{GO} OpVault_{Gen}$ in advance when no particular service is requested.

The client device DEV owns a unique secret device personal key $^U DK$ hard coded in a chip set. This unique secret device key $^U DK$ is independent of the operator. In order to be able to receive personalized services from an operator Op, the client device DEV performs an initialization phase by requesting at the provisioning server PVS necessary cryptograms that are specific to the operator Op and usable by the concerned client device DEV only. This initialization phase may be carried out at first start of the client device DEV, after a software or firmware update, or periodically as for example every one or more months.

During the initialization phase, the client device DEV transmits a request, in particular a pre-provisioning challenge REQp, to the provisioning server PVS. The pre-provisioning challenge REQp for an operator Op comprises at least unique identification data DEV-ID of the client device DEV and an identifier of the operator Op.

At reception of the pre-provisioning challenge REQp, the provisioning server PVS can optionally verify that the client device DEV is duly recorded in the database DB based on the received identification data DEV-ID. If the verification is successful, the provisioning server PVS retrieves from the database DB the unique device key $^U DK$ and cryptographic parameters specific to the operator Op, also called global operator seed $^{GO} OpSeed_{Gen}$. A cryptographic derivation function is then applied on the unique device key $^U DK$ by using the global operator seed $^{GO} OpSeed_{Gen}$ for calculating at least one unique device derived key $^{UO} K_{DER\ Gen}$ for the operator Op. The obtained unique device derived key $^{UO} K_{DER\ Gen}$ is thus specific to the client device DEV and to the operator Op. The cryptographic derivation function may include a TDES (Triple Data Encryption) symmetric-key block cipher algorithm or an algorithm based on AES (Advanced Encryption Standard).

The provisioning server PVS further encrypts the obtained unique device derived key $^{UO}K_{DER\ Gen}$ with a global operator license server key $^{GO}K_{LS\ Gen}$ to form a unique cryptogram $[^{UO}K_{DER\ Gen}]^{GO}K_{LS\ Gen}$ specific to the operator and to the client device DEV. The global operator license server key $^{GO}K_{LS\ Gen}$ may be also retrieved from the database DB of the provisioning server PVS. The unique cryptogram $[^{UO}K_{DER\ Gen}]^{GO}K_{LS\ Gen}$ is then incorporated in a device instance certificate $^{UO}DIC$ assigned to a particular operator Op.

The device instance certificate $^{UO}DIC$ is then transmitted by the provisioning server PVS, in a secure way, to the client device DEV and stored in a non-volatile memory thereof. The provisioned data in the client device DEV may thus comprise at least the cryptogram $[^{UO}K_{DER\ Gen}]^{GO}K_{LS\ Gen}$.

The device instance certificate $^{UO}DIC$ may include a header section in clear comprising for example the identifier of the operator Op followed by encrypted payload section comprising the necessary keys, cryptograms and parameters to be used by a license server OpLS of the operator Op.
Exploitation Phase Carried Out by the Client Device During an exploitation phase in order to acquire a service managed by the operator Op, the client device DEV sends a license request, hereafter called a post-provisioning challenge REQI, to the operator license server OpLS.

The post-provisioning challenge REQI comprises at least the device instance certificate $^{UO}DIC$ comprising the unique cryptogram $[^{UO}K_{DER\ Gen}]^{GO}K_{LS\ Gen}$. The operator license server OpLS owning the global license server key $^{GO}K_{LS\ Gen}$ decrypts the cryptogram $[^{UO}K_{DER\ Gen}]^{GO}K_{LS\ Gen}$ and obtains the unique device derived key $^{UO}K_{DER\ Gen}$. This unique device derived key $^{UO}K_{DER\ Gen}$ is then used to encrypt a service key SK either produced by the license server OpLS itself or retrieved from an external service keys server.

The operator license server OpLS returns, in response to the post-provisioning challenge REQI, a license L ($[SK]^{UO}K_{DER\ Gen}$) comprising at least the encrypted service key $[SK]\ ^{UO}K_{DER\ Gen}$. The received license L may be stored in a non-volatile memory of the client device DEV.

Figure 2:
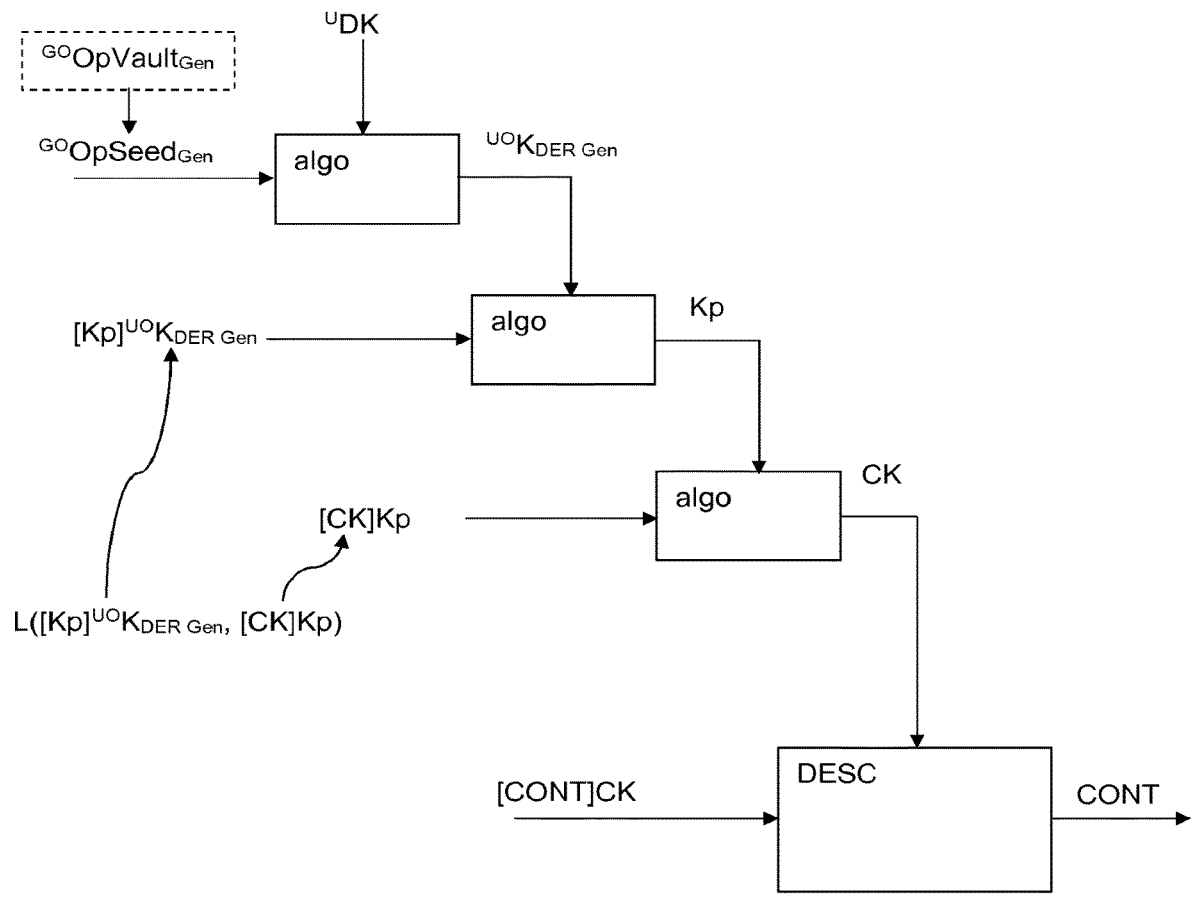
FIG. 2 shows a key ladder example used in the client device for calculating a unique derived device key used for calculating a unique operator specific device key. Further derivations allow calculating a content key for descrambling a service provided by the operator.

The client device DEV owning the unique secret device key $^{U}DK$ may perform successive decryption operations by using a key ladder schema as illustrated by FIG. 2.

The key ladder allows carrying out successive derivations by applying, for example, a TDES (Triple Data Encryption) symmetric-key block cipher algorithm, which applies the Data Encryption Standard (DES) cipher algorithm three times to each data block or AES (Advanced Encryption Standard). The derivations may be carried out by a key ladder having three stages or more.

The global operator vault $^{GO}OpVault_{Gen}$ previously downloaded is processed by the client device DEV for extracting the global operator seed $^{GO}OpSeed_{Gen}$ which is then input into the first stage of the key ladder together with the device unique key $^{U}DK$. An algorithm (algo) applied to the global operator seed $^{GO}OpSeed_{Gen}$ and the unique device key $^{U}DK$ allows calculating the unique device derived key $^{UO}K_{DER\ Gen}$. The client device DV decrypts the service key SK with the obtained unique device derived key $^{UO}K_{DER\ Gen}$. The obtained service key SK allows descrambling a scrambled service $[S_{Op}]SK$ as for example a broadcast audio/video content, a video on demand content, a game, stock exchange, or any other multimedia service to be exploited by the client device DEV.

According to an embodiment, the service key SK encrypted with the unique device derived key $^{UO}K_{DER\ Gen}$ may include a content package key Kp encrypted with the unique device derived key $^{UO}K_{DER\ Gen}$. In this case, the license L comprises in addition a content key CK encrypted with the content package key Kp. The client device DEV therefore decrypts the content package key Kp with the calculated unique device derived key $^{UO}K_{DER\ Gen}$, and the content key CK with the content package key Kp previously decrypted.

The content package key Kp may be provided to the operator license server OpLS by an external source, as for example an operator content managing server or a head end. When the content package key Kp corresponds to a client device specific content key related to a particular multimedia content or service such as a VOD (Video On Demand) content, the content package key Kp may be produced by the license server OpLS independently of any external source. The content package key Kp may be a one time usage random value in case of a VOD content such as a movie for example. The value of Kp and also the content key CK binds uniquely a specific movie to one unique client device including a unique chipset key.

When the content package key Kp authorizes access to live content such as television programs broadcast over a set of channels, Kp may be segmented across bouquets of channels grouping channels according to content type as for example: sport channels, cartoon channels, music channel, film channel etc. For example, one content package key Kp may be used for protecting several content keys CK, each content key CK being used to decrypt content provided by a predefined channel or one content package key Kp may be used for protecting one common content key CK used for decrypting content provided by several channels.

The encrypted content [CONT]CK or service may be provided by any source such as a broadcast satellite, a terrestrial broadcast emitter, a cable, a wired or wireless Content Distribution Network (CDN) performing streaming by using for example IP (Internet Protocol) multicast or unicast, a VOD server of the operator, etc.

The obtained content key CK corresponds, for example, to a control word CW used for decrypting the multimedia content or service or to data used to calculate the control word. Over the Internet, the content key may usually correspond to a key associated to a live channel for a given duration (e.g. 1 day) or to a predefined VOD movie.

The received service or multimedia content which is encrypted with the content key CK is descrambled by the client device DEV with the content key CK obtained by the successive decryption operations from the cryptograms $[Kp]^{UO}K_{DER\ Gen}$ and $[CK]Kp$ provided by the operator license server OpLS of the operator.

The content key CK is obtained by decrypting the cryptogram ($[CK]Kp$) with the content package key Kp by applying the algorithm (algo). The client device DEV further comprises a descrambler DESC for descrambling the encrypted content [CONT]CK with the content key CK, which is specific to the client device DEV and to the operator Op. The content in clear CONT obtained at an output of the descrambler DESC may be rendered on a television set for example.

The content package key Kp and the content key CK can be decrypted only if the unique device derived key $^{UO}K_{DER\ Gen}$ produced by the key ladder of the client device DEV corresponds to the unique device derived key $^{UO}K_{DER\ Gen}$ obtained by the license server OpLS by decrypting the cryptogram $[^{UO}K_{DER\ Gen}]^{GO}K_{LS}$ Gen with the global operator license server key $^{GO}K_{LS\ Gen}$. The operator license server OpLS uses the obtained unique device derived key $^{UO}K_{DER\ Gen}$ for encrypting the content package key Kp and the content key CK before transmitting to the client device DEV. The correspondence between the unique device derived key $^{UO}K_{DER\ Gen}$ determined by the operator license server OpLS and the unique device derived key $^{UO}K_{DER\ Gen}$ produced by the client device DEV forms a link between the device instance certificate $^{UO}DIC_{Gen}$ provided by the provisioning server PVS and the keys generated by the client device DEV based on the global operator seed $^{GO}OpSeed_{Gen}$ and the unique device key $^{U}DK$.

The method as disclosed allows managing multiple operators thanks to possibility of provisioning operator specific device instance certificate $^{UO}DIC$. The provisioning server PVS provides for a particular client device DEV a device instance certificate $^{UO}DIC$ to be submitted to an operator license server OpLS in order to obtain a license L ($[Kp]^{UO}K_{DER\ Gen}$, [CK]Kp) usable only for one given operator Op by a given client device DEV.

It has to be noted that the unique device derived key $^{UO}K_{DER\ Gen}$ encrypted with the global operator license server key $^{GO}K_{LS\ Gen}$ may be exposed to the license server of an operator Op contrarily to the unique hard coded device secret key $^{U}DK$ which is never exposed.

The global operator seed $^{GO}OpSeed_{Gen}$ combined with a unique derived client secret key $^{U}DK$ not specific to the operator gives a secret which is unique per client device DEV, specific to the operator Op. In case of exposition of the global operator seed $^{GO}OpSeed_{Gen}$ to other servers, the secret unique client key $^{U}DK$ is not compromised. The global operator seed $^{GO}OpSeed_{Gen}$ being specific to the operator is used to generate a unique device derived key $^{UO}K_{DER\ Gen}$ specific to the operator. In order to exploit several services each provided by a particular operator, the client device DEV generates a unique device derived key $^{UO}K_{DER\ Gen}$ for each operator from a global operator seed $^{GO}OpSeed_{Gen}$ provided by each operator.

Furthermore, the secret is valid during a limited time period thanks to the generation (Gen) control. The provisioning server PVS may produce several generations of device instance certificates $^{UO}DIC_{gen}$ containing each one generation of cryptogram $[^{UO}K_{DER\ Gen}]^{GO}K_{LS\ Gen}$. The client device DEV will receive one device instance certificate of a given generation in response to the pre-provisioning challenge.

In case a device instance certificate generation is compromised by hacking the operator license server OpLS or expired after a predefined time period for example, the client device may request a new device instance certificate $^{UO}DIC_{gen}$ of next generation at the provisioning server PVS.

According to an option, the client device DEV may receive one device instance certificate $^{UO}DIC$ containing several generations of cryptograms $[^{UO}K_{DER\ Gen}]^{GO}K_{LS\ Gen}$ to be stored in a non-volatile memory. In case of generation change, the next cryptogram generation can be retrieved from the memory for transmitting to the operator license server OpLS without a request to the provisioning server PVS.

In case of a generation change, the applications server APPS may provide an update of the application dedicated to the operator, the update leading to a download of an updated version of the global operator vault $^{GO}OpVault_{Gen}$ into the client device DEV. Similarly to the device instance certificate generations, several generations of global operator vaults $^{GO}OpVault_{Gen}$ may be provided or one $^{GO}OpVault$ containing several generation of seeds $^{GO}OpSeed_{Gen}$. The global operator vault $^{GO}OpVault_{Gen}$ may contain an index indicating which generation is currently used.

According to an embodiment, the global operator vault $^{GO}OpVault_{Gen}$ may be encrypted by a global operator vault key $^{GO}K_{Opvault}$ which may be provided to the client device DEV by the provisioning server PVS in addition to the device instance certificate $^{UO}DIC$.

According to a further embodiment, the global operator vault $^{GO}OpVault_{Gen}$ of a given generation may contain the seeds of the preceding generation (s) for generating a unique device derived key $^{UO}K_{DER\ Gen}$ of a generation preceding a current generation. This case may arise when a content recorded on a storage medium such as a hard disc has to be decrypted by the client device DEV with a content key CK. The content key CK can be obtained by the same client device DEV from a preceding seed $^{GO}OpSeed_{Gen}$ generation.

In several embodiments, the pre-provisioning REQp challenge and the post-provisioning challenge REQl transmitted by the client device DEV the answer to the pre-provisioning challenge REQp transmitted by the provisioning server PVS and the answer to the post-provisioning challenge REQl transmitted by the operator license server OpLS are cryptographically signed. The signatures may comprise a digest of the transmitted data encrypted with a key of the concerned server (e.g., the PVS, the OpLS) or the client device DEV.

In an implementation, when encrypted data is transmitted over an insecure channel (e.g. the link between the cloud and the client device DEV), the transmitting and/or the receiving party (e.g., server to client device and/or vice-versa) may monitor communication and obtain verification of the identity of the other party, the integrity of the encrypted data, and the origin of the transmitted encrypted data.

A transmitting entity may create a signature on a message before transmitting the message. A signature of a message may be computed, for example, by applying an algorithm or signing function to the message. Before creating the signature, the outgoing message may be hashed by applying a unidirectional collision free hash algorithm (e.g. types MD5 or SHA) to obtain a message digest. A signature algorithm may then be applied to the message digest by using, for example, a private key in order to generate the signature. After generating the signature, the set formed by the message and the signature may be transmitted. The digital signature may then be transmitted together with the message digest. A receiving entity (e.g., server or client device) may then receive the signature and the message digests and then apply the same hash algorithm used by the transmitting entity on the message to obtain a message digest. In order for the receiving entity to verify that the signature on the received message was created by the transmitting entity and not by a third outside party, a verification algorithm may be applied to the message digest. To verify that a signature on a message was created by a transmitting entity, a receiving entity (referenced to as a verifier) may obtain the verification function of the transmitting entity. The receiving entity may compute a result from applying the verification function. If the result is true, the signature may be authenticated as created by the transmitting entity. If the result is false, the signature may be rejected as unauthorized. Similarly, the verification algorithm may use a public key together with the message digest in order to authenticate the signature. There are several properties that may be required of the signing and verification functions, respectively. The signature of the message is valid if and only if the verification function returns a true result. In addition, the signing algorithm and the verification algorithm are selected so that it is computationally infeasible for any entity, other than the transmitting and the receiving entities, to find, for any incoming message digest, a signature such that the verification algorithm returns a true result.

As discussed above, a processing device of a client device may exploit a scrambled service provided by an operator, the client device having a unique device key for provisioning unique cryptographic key material specific to the operator and to the client device. The provisioned unique cryptographic key material can be configured to obtain a service key for descrambling the scrambled service. The processing device of the client device downloads a global operator vault, comprising at least an operator specific global seed and transmits a pre-provisioning challenge for the operator to a provisioning server. The provisioning challenge can include at least a unique identifier of the client device and an identifier of the operator. In response to pre-provisioning challenge, the processing device of the client device can receive from the provisioning server, at least one device instance certificate comprising a unique cryptogram associated with the operator and to the client device. The processing device of the client device transmits a post-provisioning challenge to an operator license server, the post-provisioning challenge comprising at least the device instance certificate, the operator license server decrypting the unique cryptogram of the device instance certificate with a global operator license server key for retrieving a unique device derived key associated with to the operator and to the client device. In response to the post-provisioning challenge, the processing device of the client device receives from the operator license server, a license comprising at least a service key encrypted with the unique device derived key. The processing device extracts the operator specific global seed from the global operator vault previously downloaded, calculates the unique device derived key by applying a cryptographic algorithm on the extracted global operator seed and the unique device key, and decrypts the service key with the calculated unique device derived key.

The processing device receives and descrambling the scrambled service with the obtained service key.

In an implementation, a processing device of a provisioning server checks entitlement of the client device in a database coupled to the provisioning server. In response to the entitlement checking operation being successful, the processing device of a provisioning server checks retrieves, from the database, a unique device key, an operator specific global seed, and a global operator license server key in view of a unique identifier of the client device and the identifier of the operator. The processing device of a provisioning server calculates the device derived key in view of a cryptographic algorithm on the unique device key and the global operator seed. The processing device of a provisioning server can form the unique cryptogram by encrypting the unique device derived key with the global operator license server key.

A processing device may be one or more general-purpose processors such as a microprocessor, central processing unit, or the like. More particularly, the processing device may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. For example, a processing device is configured to execute the processing logic for performing the operations and steps discussed herein.

The reader of skill in the art will, of course, appreciate that claimed embodiments of the present application are intended to provide one or more technical solution(s) to a technical problem unique to modern cryptography keys in client devices in order to provide strong client authentication with a strong binding of sensitive data to a specific client device and a clean segmentation of the unique device keys between operators, for at least solving the technical problems relating to large ranges of symmetric secrets that are complex to secure when deployed in public clouds. As discussed above, the claimed embodiments are substantially different from current routine steps and results when using conventional networks or computing elements because the present disclosure describes, for example, a post-provisioning challenge to an operator license server, where in response to the post-provisioning challenge, the processing device of the client device receives from the operator license server, a license comprising at least a service key encrypted with the unique device derived key, and the processing device extracts the operator specific global seed from the global operator vault previously downloaded, calculates the unique device derived key by applying a cryptographic algorithm on the extracted global operator seed and the unique device key, and decrypts the service key with the calculated unique device derived key. For example, using a small set of global cryptographic data in each operator server, as described, indeed improves secure networked communications by allowing reducing the set of sensitive data to secure in the cloud. Thus, as clearly technical solutions to patently technical problems, the claimed embodiments cannot be misunderstood as intended to foreclose un-claimed ways of solving these or other problems.

What is claimed is:

1. A method of descrambling a scrambled service, comprising:
    transmitting a first challenge, by a client device to an operator server, wherein the first challenge including at least a unique identifier of the client device and an identifier of the operator server;
    receiving, by the client device, in response to determining that the client device is entitled to descramble the scrambled service, a certificate corresponding to the client device;
    transmitting, by the client device, a second challenge to the operator server, wherein the second challenge requesting a license, and including at least the certificate corresponding to the client device;
    receiving, by the client device in response to the second challenge, the license from the operator server, the license including at least a service key encrypted with a unique device-derived key;
    downloading, from the operator server, a global operator vault that stores a global operator seed;
    determining, by the client device, the unique device-derived key by applying a cryptographic algorithm on the global operator seed and a unique device key corresponding to the client device;
    decrypting, by the client device, the service key with the determined unique device-derived key; and
    receiving and descrambling, by the client device, the scrambled service using the service key.

2. The method according to claim 1, further comprising extracting, by the client device, the global operator seed from the global operator vault.

3. The method according to claim 2, wherein to extract the global operator seed from the global operator vault, the method further comprises decrypting the global operator vault with a global operator vault key received from the operator server by the client device with the certificate corresponding to the client device.

4. The method according to claim 1, wherein the global operator vault is stored in non-volatile memory in the client device.

5. The method according to claim 1, wherein the global operator value stores a plurality of global operator seeds corresponding to a plurality of cryptographic generations.

6. The method according to claim 5, further comprising changing a cryptographic generation if a current global operator seed is compromised, or periodically changing the cryptographic generation.

7. The method according to claim 1, wherein the service key incudes a content package key encrypted with the unique device-derived key, and a content key encrypted with the content package key.

8. The method according to claim 7, further comprising:
decrypting, by the client device, the content package key with the unique device-derived key; and
decrypting, by the client device, the content key with the content package key after the content package key is decrypted.

9. A client device that descrambles a scrambled service, comprising: circuitry configured to
transmit a first challenge, by the client device to an operator server, wherein the first challenge including at least a unique identifier of the client device and an identifier of the operator server;
receive in response to determining that the client device is entitled to descramble the scrambled service, a certificate corresponding to the client device;
transmit a second challenge to the operator server, wherein the second challenge requesting a license, and including at least the certificate corresponding to the client device;
receive, in response to the second challenge, the license from the operator server, the license including at least a service key encrypted with a unique device-derived key;
download, from the operator server, a global operator vault that stores a global operator seed;
determine the unique device-derived key by applying a cryptographic algorithm on the global operator seed and a unique device key corresponding to the client device;
decrypt the service key with the determined unique device-derived key; and
receiving and descrambling the scrambled service using the service key.

10. A method of descrambling a scrambled service, comprising:
receiving, by an operator server, a first challenge from a client device, the first challenge including at least a unique identifier of the client device and an identifier of the operator server;
determining, by the operator server, entitlement of the client device to descramble the scrambled service, based at least on the unique identifier of the client device;
determining, by the operator server, a unique device key corresponding to the client device based at least on the unique identifier of the client device;
determining, by the operator server, in response to determining that the client device is entitled to descramble the scrambled service, a device-derived key by applying a cryptographic algorithm to the unique device key and a global operator seed corresponding to the operator server;
creating, by the operator server, a unique cryptogram by encrypting the device-derived key with the global operator seed;
transmitting, from the operator server to the client device, a first certificate corresponding to the client device, the first certificate including the unique cryptogram;
receiving, by the operator server, a second challenge from the client device, the second challenge including a license request and at least a second certificate corresponding to the client device; and
providing, from the operator server to the client device in response to the second challenge, the license from the operator server, the license including at least a service key encrypted with the device-derived key,
wherein the client device obtains the unique device-derived key from the unique cryptogram to decrypt the service key, and uses the service key to descramble the scrambled service.

11. The method according to claim 10, further comprising: providing, from the operator server to the client device, a global operator vault including the global operator seed.

12. The method according to claim 11, further comprising:
providing, from the operator server to the client device, a plurality of unique cryptograms corresponding to a plurality of encryption generations, wherein the global operator vault includes a plurality of global operator seeds corresponding to the plurality of encryption generations.

13. The method according to claim 12, further comprising:
changing a current encryption generation if a current global operator seed is compromised, or periodically changing the current encryption generation.

14. The method according to claim 11, wherein the global operator vault is encrypted with a global operator vault key.

15. The method according to claim 14, further comprising transmitting, by the operator server, the global operator vault key to the client device at a time when the first certificate corresponding to the client device is transmitted.

16. The method according to claim 10, wherein the service key incudes a content package key encrypted with the device-derived key, and a content key encrypted with the content package key.

17. An operator server, comprising: circuitry configured to receive a first challenge from a client device, the first challenge including at least a unique identifier of the client device and an identifier of the operator server;
determine entitlement of the client device to descramble a scrambled service, based at least on the unique identifier of the client device;
determine a unique device key corresponding to the client device, based at least on the unique identifier of the client device;
determine in response to determining that the client device is entitled to descramble the scrambled service, a device-derived key by applying a cryptographic algorithm to the unique device key and a global operator seed corresponding to the operator server;

create a unique cryptogram by encrypting the device-derived key with the global operator seed;

transmit, to the client device, a first certificate corresponding to the client device, the first certificate including the unique cryptogram;

receive a second challenge from the client device, the second challenge including a license request and at least a second certificate corresponding to the client device; and provide, to the client device in response to the second challenge, the license from the operator server, the license including at least a service key encrypted with the device-derived key, wherein the client device obtains the unique device-derived key from the unique cryptogram to decrypt the service key, and uses the service key to descramble the scrambled service.

18. The operator server according to claim 17, wherein the circuitry is further configured to:

provide, to the client device, a plurality of unique cryptograms corresponding to a plurality of encryption generations, wherein a global operator vault includes a plurality of global operator seeds corresponding to the plurality of encryption generations.

19. The operator server according to claim 18, wherein the circuitry is further configured to change a current encryption generation if a current global operator seed is compromised, or to periodically change the current encryption generation.

* * * * *